Dec. 18, 1934.  J. G. COLLISON  1,985,078
VALVE
Filed Feb. 24, 1933    2 Sheets-Sheet 1
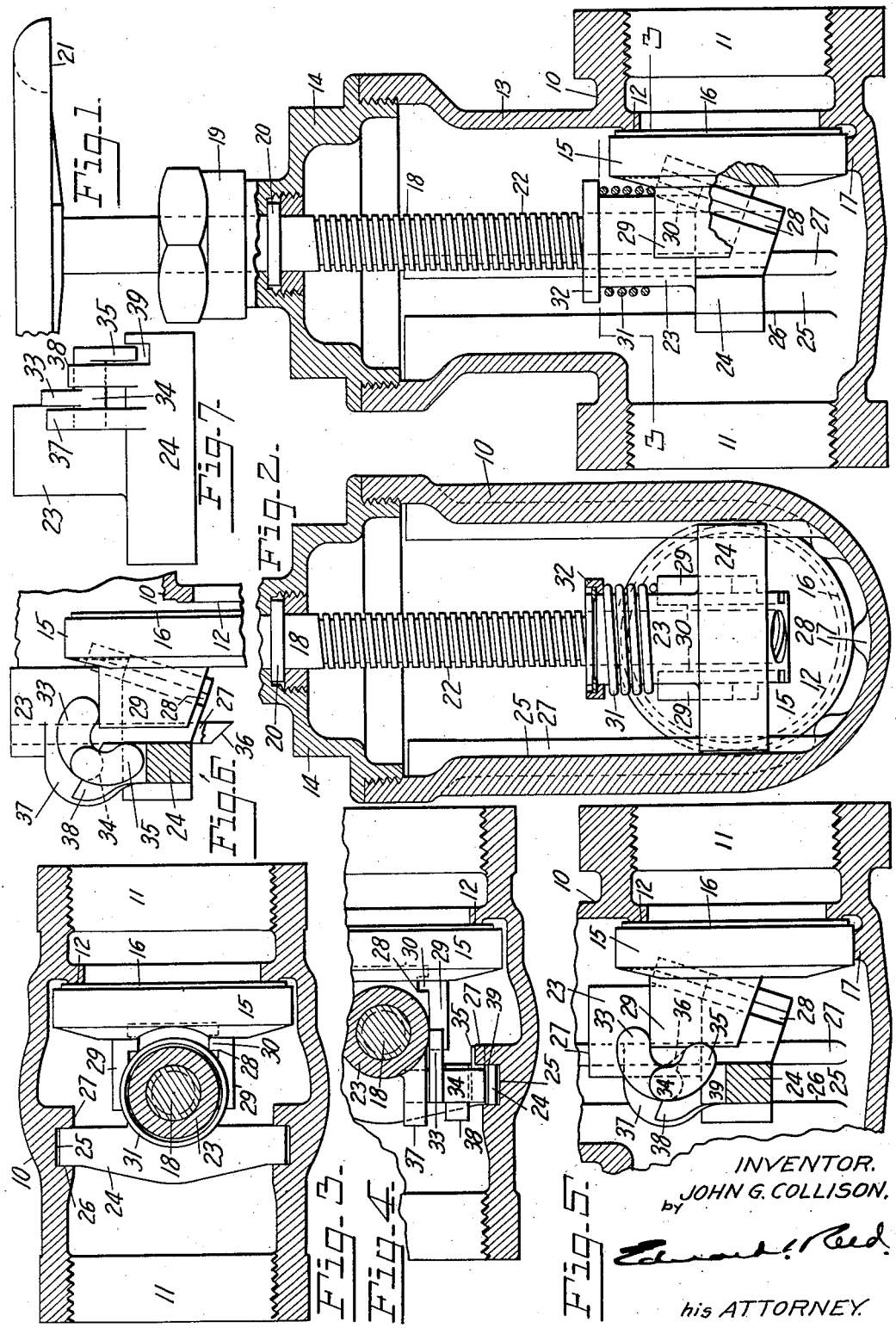
INVENTOR.
JOHN G. COLLISON.
by Edward L. Reed
his ATTORNEY.

Dec. 18, 1934.     J. G. COLLISON     1,985,078
VALVE
Filed Feb. 24, 1933     2 Sheets-Sheet 2

INVENTOR.
JOHN G. COLLISON.
by
his ATTORNEY.

Patented Dec. 18, 1934

1,985,078

UNITED STATES PATENT OFFICE 1,985,078

VALVE

John Gilbert Collison, Cleveland, Ohio, assignor to Au-Vo-Col Corporation, Cleveland, Ohio, a corporation of Ohio Application February 24, 1933, Serial No. 658,291

10 Claims. (Cl. 251—57)

This invention relates to a valve and more particularly to a valve of the general type known as gate valves. In a gate valve the valve member is moved transversely to its seat, that is, in a direction substantially parallel with the face of the valve seat, into and out of its closed position. In some instances the valve member is wedge shaped so that its transverse movement will cause it to engage the valve seat. In other instances as the valve member approaches alinement with the valve seat it is moved toward the valve seat and into engagement therewith. In either instance the valve member will have transverse movement with relation to the valve seat after its initial engagement therewith and this movement results in a frictional contact between the valve member and the seat which is highly destructive of the valve surface, this being particularly true in the case of valve members which are provided with a relatively soft face, such as composition valves.

One object of the present invention is to provide a valve of this type in which the valve member will have no movement on the valve seat after it engages the latter but will engage the same with a direct axial pressure only, thereby eliminating all frictional contact between the valve member and its seat.

A further object of the invention is to provide such a valve with actuating means which will move the valve member first into line with the valve seat and then into engagement with the valve seat.

A further object of the invention is to provide such a valve in which the movements of the valve into line with the valve seat and then into engagement therewith will be separately accomplished by the continued movement of the actuating device in one direction.

A further object of the invention is to provide such a valve which will be simple in its construction and operation and which may be produced at a relatively low cost.

Other objects of the invention will appear as the device is described in detail.

Figure 8:
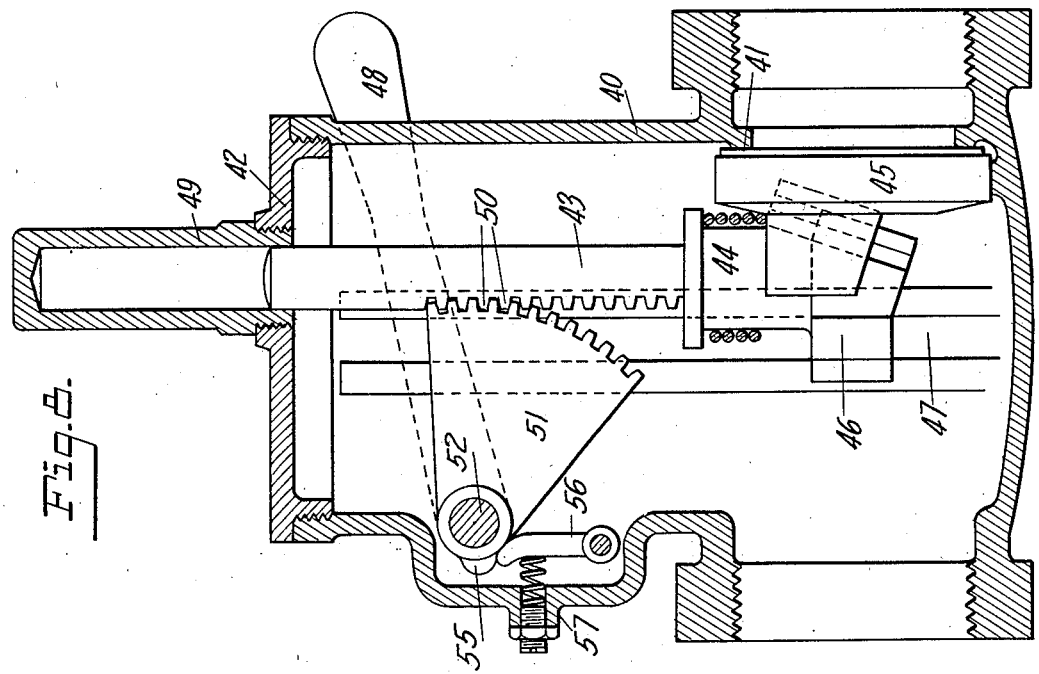
Figure 9:
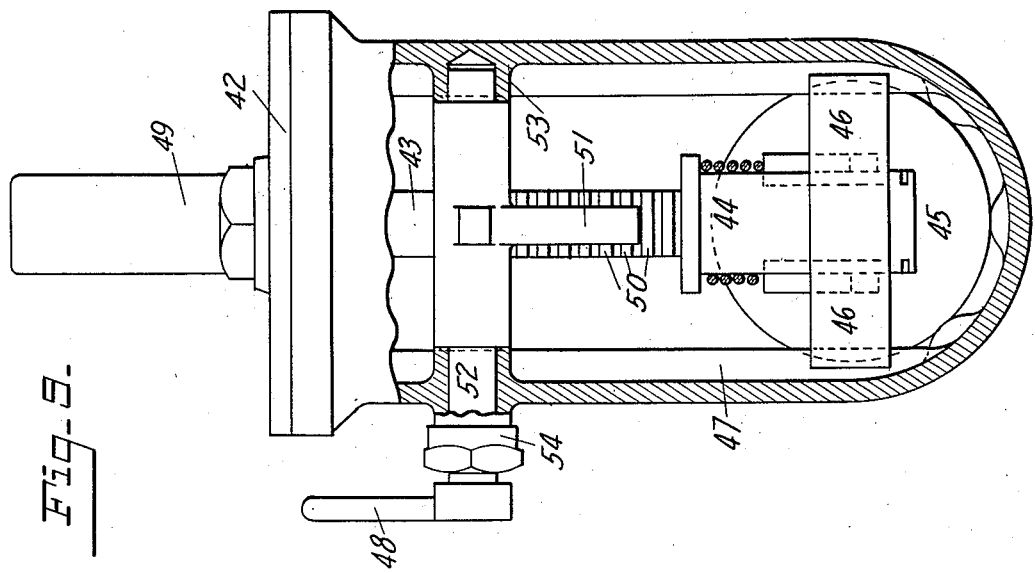

In the accompanying drawings Fig. 1 is a vertical sectional view of a valve embodying my invention, taken axially of the valve seat, and partly broken away; Fig. 2 is a vertical sectional view of such a valve taken transversely to the axis of the valve seat and partly broken away; Fig. 3 is a horizontal sectional view taken on the line 3—3 of Fig. 1; Fig. 4 is a sectional detail view showing in plan a modified form of device for controlling the movement of the valve member with relation to its actuating device; Fig. 5 is a sectional view of a portion of the valve showing the controlling device of Fig. 4 in side elevation, with the valve seated; Fig. 6 is a view similar to Fig. 5, showing the valve moved partially out of alinement with the valve seat; Fig. 7 is a rear elevation of a portion of the actuating device and the controlling device; Fig. 8 is a vertical section taken through a valve showing a modified form of operating mechanism in side elevation; and Fig. 9 is an end view of the valve of Fig. 8, partly broken away.

In these drawings I have illustrated one embodiment of my invention, with certain modifications thereof, but it will be understood that this particular embodiment has been chosen for the purpose of illustration only and that the valve member and the actuating device may take various forms without departing from the spirit of the invention.

In the particular embodiment here illustrated the valve comprises a casing 10 having alined openings 11 to provide for the ingress and egress of the fluid and having a valve seat 12 surrounding one of these openings. The valve seat may be of any suitable character but, as here shown, has a flat contact face arranged in a plane at right angles to the axis of the openings 11. The casing has an upwardly extending part 13 to provide a chamber to receive the valve member and its actuating device. This chamber is provided with a suitable closure, here shown as a cap 14 screw threaded into the upper end of the extension 13.

Cooperating with the valve seat 12 is a valve member 15 which may be of any suitable character but which is here shown in the form of a metal disk having a flat contact face 16 to engage the valve seat 12. This contact face of the valve member may, if desired, be formed of relatively soft material, such for example as is commonly used in composition valves. This valve member is mounted for movement into and out of line with the valve seat and means are provided to interrupt the movement of the valve member transversely to the valve seat when it has been properly alined therewith and to guide the same in a straight line into engagement with the valve seat. This means as here shown comprises a series of lugs 17 spaced about the lower portion of the valve casing and arranged to be engaged by the valve member when it reaches its alined position. If desired, the lugs may be rounded or tapered to provide them with relatively narrow contact surfaces which will prevent or minimize the accumulation of sediment thereon.

Any suitable means may be provided for imparting the desired movement to the valve member but preferably this means comprises a single actuating device, the continued movement of which in one direction will cause the valve member to be first moved into line with the valve seat and then moved into engagement with the valve seat, and the continued movement of which in the opposite direction will first move the valve member out of engagement with the valve seat and then move it out of line therewith. Such an actuating device may conveniently consist of a rod or valve stem 18 movably mounted in the closure 14 for the upper portion of the casing, a stuffing box 19 being provided to prevent leakage. In the present construction this actuating rod is rotatably mounted in the closure and is held against longitudinal movement therein, as by a collar 20. Suitable operating means, such as a hand wheel 21, is connected with the outer end of the actuating rod. Suitable means are provided for so connecting this rod with the valve member that the rotation of the rod will impart the desired movements to the valve member. In the form here shown the lower or inner end portion of the rod is screw threaded, as shown at 22, and the connecting means comprises a threaded sleeve or nut 23 mounted on the threaded portion of the rod and held against rotation, so that the rotation of the rod will cause the connecting device to move lengthwise of the rod. The connecting device is preferably held against rotation by providing the same with parts to engage the walls of the casing and, as here shown, the nut 23 has secured thereto oppositely extending arms 24, the outer ends of which are slidably mounted in guideways 25 on the side walls of the casing. In the present casing these guideways are formed between shoulders 26 and inwardly extending ribs 27 on the respective sides of the guideways. These guideways and arms not only hold the connecting device against rotation but also hold the same against lateral displacement and the shoulders 26 constitute rigid abutments sufficient to sustain any pressure which may be exerted upon the valve member by its actuating device. The lower portion of the connecting member or nut 23 has flat parallel sides which are provided with inclined grooves 28, and the valve member 15 has rigidly secured thereto, and formed integral therewith if desired, rearwardly extending lugs or ears 29 having on their inner sides inclined ribs 30 which are slidably mounted in the corresponding grooves 28 in the nut 23. This arrangement permits the valve member to have a limited movement with relation to the connecting member and lengthwise of the actuating rod 18 and it is prevented from dropping off the connecting member by its contact with the front face of the connecting member. The movement of the connecting member with relation to the valve member will cause the valve member to move in a direction at substantially right angles to the line of movement of the connecting member.

When the valve is in its fully open position the valve member and the connecting device 23 will be within the extension 13 of the valve casing, and out of line with the valve seat. When the valve rod is rotated in a direction to close the valve the connecting member and valve member will move downwardly together until the valve member engages the lugs or stops 17, at which time it is properly alined with the valve seat. When the movement of the valve member has thus been interrupted the continued movement of the connecting member 23 will move the valve member in the direction of the axis of the valve seat and thus cause the same to engage the valve seat without any movement with relation to the latter other than its movement directly toward the same. When that valve rod is rotated in the opposite direction the connecting member will move upwardly with relation to the valve member and thus move the same in a right line out of engagement with the valve seat and when the connecting member has reached the limit of its movement with relation to the valve member the latter will move with the connecting member and both parts will again move into the extension 13 of the casing. In neither the closing nor opening movement of the valve member will there be any rubbing or frictional action between the valve member and its seat.

The sliding connection between the valve member and the nut 23 of the connecting device is sufficiently loose to prevent any substantial friction between the parts and consequently the valve member will normally tend to move by gravity toward its lowermost position, that is, toward the limit of its movement with relation to the connecting device. However, in order to avoid any possibility of the valve member being dragged upwardly with the connecting device before it is moved out of engagement with the valve seat means may be provided which will tend to move the valve member toward the limit of its movement with relation to the connecting device and which will thus hold the valve member against upward movement until it has been withdrawn from its seat. This means is also adapted to prevent the valve member from dropping off the connecting device in case the valve is inverted. It is shown in Figs. 1 and 2 as a spring 31 which is confined between a collar 32 on the connecting device 23 and the lugs 29 on the valve member. It will be understood that any reference to the upper or lower parts of the apparatus applies only to the positions shown in the drawings and that the valve may be mounted in any desired position about the axis of the valve seat. If the valve is mounted with the extension 13 directed downwardly the spring 31 will support the valve member against the lugs 17 until the connecting device has reached the limit of its movement with relation thereto and the spring will continue to support the valve member at its outermost position with relation to the connecting device until the valve member is again moved to its closed position.

In the event it is not desirable to use a spring for this purpose a mechanical actuating device may be substituted for the spring and in Figs. 4 to 7 I have illustrated one form of such a device to positively control the position of the valve member with relation to the connecting device. As there shown, the controlling device comprises an arm 33 rigidly secured to a short shaft or trunnion 34 which is pivotally mounted on the connecting device 23. This arm is curved and has a rounded end which engages the upper edge of one of the lugs 29 of the valve member. A second or lower arm 35 is also rigidly connected with the trunnion 34 and is curved toward the valve member. This lower arm engages and is controlled by the adjacent rib 27 on the casing. This rib 27 has its lower end arranged some distance above the bottom of the valve casing and provided with an inclined surface, as shown at 36. The arms are of such length and so arranged that when the valve member is in its open or partially open position, as shown in Fig. 6, the arm 35 will ride on the rear surface of the rib 27 and the upper arm 33 will be held in firm contact with the upper edge of the lug 29 and will thus hold the valve member 15 at the lower limit of its movement with relation to the connecting device 23. When the valve member is moved downwardly to the lower limit of its movement and the connecting device 23 moved downwardly with relation thereto to seat the same the lower arm 35 will engage the beveled edge 36 of the rib at the beginning of the movement of the connecting device with relation to the valve member and as this movement continues the arm 35 will gradually elevate the upper arm 33 sufficiently to permit of the relative movement of the parts. When the connecting device 23 is moved upwardly from the position shown in Fig. 5 the lower arm 35 will engage the beveled end of the rib and will move the upper arm 33 downwardly with relation to the connecting device, thus maintaining the same in engagement with the lug 29 and preventing any upward movement of the valve member until the arm 35 has moved off the inclined surface 36 and onto the straight rear edge of the rib 27. The upper arm 33 is positively held in engagement with the lug 29 at all times and therefore positively controls the position of the valve member with relation to the actuating device. The controlling device may be mounted on the connecting device in any suitable manner but the present device is very simple and very easy to assemble. As here shown, I have provided one of the arms 24 of the connecting device with upwardly extending bearing lugs 37 and 38. In the lug 37 the bearing opening is circular while in the lug 38 the bearing opening is approximately semicircular and has its upper side open. The arm 24 is provided on the outer side of the lug 38 with a transverse recess 39. By turning the controlling device a short distance in a counter-clockwise direction from the position shown in Fig. 5 the arm 35 will be arranged above the arm 24 of the connecting device and the trunnion 34 may be inserted in the bearing lug 37 and then dropped into the open bearing in the lug 38, and in this position the arm 35 will enter the slot 39 when the arm 33 is moved above the lug 29 of the valve member. When the connecting device as a whole has been assembled the arm 35 will be held in the slot 39 by the rib 27 and will thus hold the trunnion against axial movement but will permit the free pivotal movement thereof.

It will also be noted that the operation of the valve member is such as to provide a very gradual interruption of the flow of fluid, thus avoiding jar or pounding which results when the flow of fluid is suddenly interrupted. As the valve member is moved into line with the valve seat it gradually restricts the flow of liquid and when it is in its lowermost position it is spaced a short distance from the valve seat, usually about one-eighth of an inch, thus greatly restricting the flow of fluid. As it is then moved toward the valve seat it gradually reduces the space and completely interrupts the flow when it engages the valve seat.

In Figs. 1 to 7 I have shown the invention in connection with an actuating device comprising a rotatable rod and a connecting member movably mounted on that rod but, as has been stated, this mechanism may take various forms and in Figs. 8 and 9 I have shown a modified arrangement in which the actuating rod reciprocates and is operated by a lever. As there shown, the casing 40 is of a general shape similar to that heretofore described and has a valve seat 41. The upper portion of the casing is closed by a cap 42. Mounted within this casing is an actuating rod 43 mounted for reciprocatory movement transversely to the axis of the valve seat and to the lower end of this rod is rigidly secured the connecting device 44 which controls the movement of the valve member 45. This connecting member is similar in construction and operation to the connecting member above described except that it moves with the reciprocatory rod 43 instead of moving lengthwise of a rotatable rod. It is provided with laterally extending arms 46 which are guided in grooves 47 on the respective sides of the casing. The upper end of the actuating rod may be guided in any suitable manner but, in the present instance, it extends through an opening in the cap 42, thus avoiding an undue length to the upper part of the casing. An operating member for imparting reciprocatory movement to the actuating rod, which is here shown as a lever 48, is, of course, mounted exteriorly of the casing and may be connected with the rod in any suitable manner. Preferably the means for connecting the lever with the actuating rod is arranged within the casing and, as here shown, the upper end of the actuating rod extends into a tubular housing 49 secured to the cap 42, thus avoiding the use of a stuffing box to prevent leakage about the rod. In the particular arrangement here shown the actuating rod 43 is provided with a longitudinal series of teeth 50 which, in the present instance, are formed in the rod itself. Meshing with these teeth is a toothed segment 51 which is rigidly secured to a shaft 52 rotatably mounted in the casing, one end of the shaft being journaled in a bearing 53 within the casing and the other end of the shaft extending beyond the casing and being rigidly secured to the lever 48. A stuffing box 54 is provided about the shaft to prevent leakage. Thus it will be apparent that the movement of the lever 48 about the axis of the shaft 50 will impart reciprocatory movement to the actuating rod 43 and that the movement of the lever from its elevated position to the position shown in Fig. 8 will first move the valve member into line with the valve seat and then move the same into engagement with the valve seat, and the movement of the lever from the position shown in Fig. 8 to its elevated position will first move the valve member out of engagement with its seat and then move the same out of line with the valve seat. To prevent the possibility of leakage between the valve member and its seat I have provided means for holding the same tightly against the seat, this means being of such a character that it will be released by the reverse movement of the operating member or lever. As here shown, the toothed segment 51 is provided with a short projection 55 extending beyond that side of its axis opposite the toothed portion thereof. This projection has an inclined and slightly recessed lower surface which is engaged by a dog 56 having a correspondingly shaped surface. A spring 57 presses the dog into engagement with the projection. When the actuating rod 43 has completed its downward movement and the valve member is seated the dog will engage the lower side of the projection 55 and will strongly resist the upward movement of the segment, thus holding the valve member against its seat. However, when substantial pressure is applied to the lever 48 the dog 56 will yield and permit the segment to move about its axis.

While I have shown and described one embodiment of my invention, together with certain modifications thereof, I wish it to be understood that I do not desire to be limited to the details thereof as various modifications may occur to a person skilled in the art.

Having now fully described my invention, what I claim as new and desire to secure by Letters Patent, is:

1. In a valve casing having a valve seat, a valve member, an actuating member movable transversely to said valve seat and having means to successively move said valve member transversely and axially of said valve seat, said actuating member having bearings, a shaft mounted in said bearings, an arm carried by said shaft and arranged to act on said valve member, a second arm carried by said shaft, said casing having a fixed part arranged to be engaged by said second arm to cause the same to actuate said shaft, one of said bearings being open at its side to permit said shaft to be inserted in said bearings when said arms are in abnormal positions and said actuating member having means to hold said shaft against axial movement when said arms are in their normal positions.

2. In a valve comprising a casing having a valve seat, an actuating device mounted in said casing for movement in a fixed path transverse to said valve seat, a valve member having a part overlapping said actuating device, said actuating device and said overlapping part of said valve member having interengaging parts to support said valve member and to move the same transversely to said actuating device, said casing having a shoulder substantially parallel with the path of said actuating device and arranged on that side of said actuating device opposite said valve member, said shoulder having an inclined surface near the inner limit of the movement of said actuating device, an arm pivotally mounted on said actuating device and having a part arranged to engage said part of said valve member for movement thereon toward and from the face of said valve member, and a second arm rigidly connected with the first mentioned arm and arranged to travel on said shoulder and to control the position of said first mentioned arm.

3. In a valve comprising a casing having a valve seat and a guideway extending transversely to and spaced from said valve seat, an actuating device mounted in said casing for movement transversely to said valve seat, a valve member arranged on one side of said actuating device and connected therewith for movement thereby into and out of engagement with said valve seat and for movement therewith transversely to said valve seat, said actuating device having on that side thereof opposite said valve member a part traveling in said guideway to hold said actuating device against movement transversely to its normal path, and a device movably mounted on said part of said actuating device, acting on said valve member to control the position of the same with relation to said actuating device and engaging a part of said casing adjacent to said guideway, said part of said casing being shaped to control the position of said movable device according to the position of said actuating device.

4. In a valve comprising a valve seat, a valve member and an actuating device connected with said valve member for movement with relation thereto and having means for moving said valve member into and out of alinement with said valve seat and for moving said valve member into and out of engagement with said valve seat while it is in alinement therewith, a movable device carried by said actuating device and having a part arranged to act on said valve member to control the position thereof with relation to said actuating device, and having a second part arranged to move in a direction different from the direction of movement of the first mentioned part and controlled by the movement of said actuating device to control the position of said first mentioned part.

5. In a valve comprising a valve seat, a valve member and an actuating device connected with said valve member for movement with relation thereto and having means for moving said valve member into and out of alinement with said valve seat and for moving said valve member into and out of engagement with said valve seat while it is in alinement therewith, a device pivotally mounted on said actuating device and having two arms extending in different directions from the axis of said device, one of said arms being arranged to act on said valve member to control the position of the latter with relation to said actuating device, and a stationary member arranged to be engaged by the other of said arms to control the movements of both arms.

6. In a valve comprising a valve seat, a valve member and an actuating device connected with said valve member for movement with relation thereto and having means for moving said valve member into and out of alinement with said valve seat and for moving said valve member into and out of engagement with said valve seat while it is in alinement therewith, a device pivotally mounted on said actuating device on an axis substantially parallel with the face of said valve member and having a part to engage said valve member for movement thereon toward and from the face of said valve member, said pivoted device also having a second part to control the position of the first mentioned part, and a stationary member to control the position of said second part while said pivoted device moves with said actuating device.

7. In a valve comprising a casing having a valve seat, a valve member mounted in said casing and an actuating device connected with said valve member for movement with relation thereto and having means for moving said valve member into and out of alinement with said valve seat and for moving said valve member into and out of engagement with said valve seat while it is in alinement therewith, said casing having an internal shoulder extending in the direction of travel of said actuating device, a member movably mounted on said actuating device and arranged to act on said valve member, and a second member mounted on said actuating device for movement with relation thereto in a direction different from the direction of movement of the first mentioned member, connected with said first mentioned member to control the position thereof and engaging said shoulder during a portion of the travel of said actuating device to hold said valve member and said actuating device against relative movement, said shoulder being arranged to release said second movable member during another portion of the travel of said actuating device and permit the latter to move with relation to said valve member.

8. In a valve comprising a casing having a valve seat, a valve member mounted in said casing and an actuating device connected with said valve member for movement with relation thereto and having means for moving said valve member into and out of alinement with said valve seat and for moving said valve member into and out of engagement with said valve seat while it is in alinement therewith, said casing having an internal shoulder extending in the direction of travel of said actuating device and said valve member having a contact surface extending transversely to the face thereof and to said shoulder, an arm pivotally mounted on said actuating device and having sliding engagement with said contact surface, and a second arm pivotally mounted on said actuating device for movement in a direction different from the direction of movement of the first mentioned arm, said second arm being operatively connected with the first mentioned arm and arranged to engage said shoulder, said shoulder being shaped to impart movement to said arms during a portion of the movement of said actuating device.

9. In a valve comprising a casing having a valve seat, a valve member movable both transversely to said valve seat and axially thereof, and an actuating device having a part movable transversely to said valve seat, connected with said valve member and provided with means for causing said movements to be successively imparted to said valve member, said casing having a fixed part adjacent to the path of said part of said actuating device and provided with an inclined surface, an arm pivotally mounted on said part of said actuating device on an axis substantially parallel with the face of said valve member and acting on said valve member to control the position thereof with relation to said part of said actuating device, and a second arm connected with the first mentioned arm and adapted to engage said part of said casing and control the movements of said first mentioned arm.

10. In a valve comprising a casing having a valve seat, an actuating device mounted in said casing for movement in a fixed path transverse to said valve seat, a valve member having a part overlapping said actuating device and provided with a contact surface transverse to the face of said valve member, said actuating device and said overlapping part of said valve member having interengaging parts to support said valve member and to move the same transversely to said actuating device, a member pivotally mounted on said actuating device on an axis substantially parallel with the face of said valve member and having a part to slidably engage said contact surface and control the position of said valve member with relation to said actuating device, and a second member movably mounted on said actuating device and connected with said pivoted member to control the movement thereof, said casing having a surface on which said second movable member travels and which is shaped to cause said second member to impart predetermined movements to said pivoted member.

JOHN GILBERT COLLISON.